(12) United States Patent
Zelechonok (10) Patent No.: US 8,454,399 B1
(45) Date of Patent: Jun. 4, 2013

(54) AMPHIBIOUS VEHICLE

(76) Inventor: Yury Zelechonok, Northbrook, IL (US)

( * ) Notice: Subject to any disclaimer, the term of this patent is extended or adjusted under 35 U.S.C. 154(b) by 191 days.

(21) Appl. No.: 13/029,491

(22) Filed: Feb. 17, 2011

(51) Int. Cl.
*B60F 3/00* (2006.01)
*B63H 19/08* (2006.01)

(52) U.S. Cl.
USPC ..................................... 440/12.51

(58) Field of Classification Search
USPC ................... 440/12.5, 12.51–12.54
See application file for complete search history.

(56) References Cited

U.S. PATENT DOCUMENTS

| | | | |
|---|---|---|---|
| 2,727,484 A | 12/1955 | White | |
| 3,134,991 A | 6/1964 | Levinson | |
| 3,172,134 A | 3/1965 | Livingstone | |
| 3,500,692 A | 3/1970 | Sangster et al. | |
| 3,673,622 A | 7/1972 | Allen | |
| 3,760,764 A * | 9/1973 | Jones et al. | 114/61.16 |
| 3,877,094 A | 4/1975 | Kelley | |
| 3,933,112 A | 1/1976 | Veazey | |
| 4,024,592 A | 5/1977 | Schlagenhauf | |
| 4,048,685 A | 9/1977 | Gail | |
| 4,354,290 A * | 10/1982 | Tevruchte et al. | 114/344 |
| 4,691,657 A | 9/1987 | Kovac | |
| 4,802,433 A | 2/1989 | Kovac | |
| 4,981,100 A | 1/1991 | Bergeron | |
| 5,027,737 A | 7/1991 | Duffty et al. | |
| 5,315,950 A | 5/1994 | Abel | |
| 5,687,669 A | 11/1997 | Engler | |
| 5,803,011 A | 9/1998 | Tatsumi | |
| 6,029,598 A * | 2/2000 | Stoll | 114/344 |
| 6,526,900 B2 | 3/2003 | Redman | |
| 6,640,737 B2 | 11/2003 | Chacon | |
| 6,679,543 B2 | 1/2004 | Messano | |
| 6,840,825 B1 | 1/2005 | Messano | |
| 6,971,931 B2 | 12/2005 | Davis | |

* cited by examiner

*Primary Examiner* — Daniel Venne
(74) *Attorney, Agent, or Firm* — John C. Shepard (57) ABSTRACT

An amphibious vehicle that may be driven directly between land and water includes a vehicle with an opposed pair of flotation side hulls and a rear hull. The side hulls are movable between a stowed position above the vehicle and a lowered deployed position outboard thereof. Each side hull is mounted by arm assemblies including an upright bracket fixed to the vehicle and an arm pivotally connected to the bracket that can be extended or retracted linearly by actuators to raise and lower the side hulls. A locking mechanism prevents the extended side hulls from moving laterally but allows vertical adjustment thereof. The side hulls may be horizontally adjusted between compact contracted and extended protracted positions. The rear hull assembly is pivotally mounted to the back of vehicle permitting raising and lowering thereof and includes jet drives providing propulsion for water operation.

25 Claims, 12 Drawing Sheets

AMPHIBIOUS VEHICLE

BACKGROUND OF THE INVENTION

1. Technical Field

The present invention relates to an amphibious vehicle and, more particularly, to a land vehicle having retractable water flotation hulls and rear-mounted propulsion means.

2. Background Art

There is a need for vehicles that can travel on land and on water and this need exists for recreational use as well as for commercial and military uses. People frequently travel and go to different or unique places, some accessible by car via road and some inaccessible by road, but perhaps accessible by boat via water. Many times, even places accessible by road would be more accessible by boat, or vice versa. Having separate vehicles, such as a car towing a trailered boat, requires that the boat be detrailered and launched into the water and that supplies, such as food, clothes, and other necessities, be transferred from the car to the boat and then back again when returning to the car.

In addition, the car must be left in a parking lot or at the side of the road or arrangements made to have the car transferred by a third party to the destination. Often, parking is inconvenient or expensive. Sometimes, there are limits on space where the vehicles are switched. For example, there may be no room to launch boats or the road may restricted to vehicles without trailers. At other times, when one does not plan to use a boat, it is still needed and may be parked somewhere else. In all these cases, amphibious vehicles would be advantageous.

There have been many attempts in the past to construct vehicles that are amphibious. These include cars that convert to boats, boats that convert to cars, trailers that convert to houseboats, and the like. The types of conversions include cars with wheels that can be folded away or retracted, vehicles with stowable pontoons that can moved into operative position, boats with extendible wheels, and the like.

Self-propelled vehicles are known in the prior art. Kovac U.S. Pat. Nos. 4,691,657 and 4,802,433 show an amphibious vehicle with watertight pontoons movable between a stowed position atop the vehicle and an operational position along each side of the vehicle by pivot arms driven by hydraulic cylinders located within the vehicle.

Abel U.S. Pat. No. 5,315,950 shows an amphibious recreational vehicle, which carries an auxiliary vehicle, provided with top-stored buoyancy tanks swung into lowered position by a combination of pivot arms connected to winch-driven cables and piston-cylinder devices. Separate propulsion units stored internally are lowered from the vehicle bottom to provide water propulsion. The propulsion units have wheels so the vehicle can be moved along the ground towards water.

An example of a trailer having pontoons stowable on the roof of the cabin is found in Gail U.S. Pat. No. 4,048,685. The pontoons are lowered and the cabin raised from a launch position to a water position by means of cable-operated pivot arms that have lockable rollers that are movable within a vertical track. A folding deck can be deployed on and between the pontoons.

Stowing pontoons on top of a wheeled boat is generally shown in Levinson U.S. Pat. No. 3,134,991 where pontoons are manually placed and in Livingstone U.S. Pat. No. 3,172,134 where pontoons are pivotally mounted and moved by a cable mechanism.

Davis U.S. Pat. No. 6,971,931 discloses an amphibious vehicle having a mono hull with a propeller drive, road wheels fore and aft on each side of the hull pivotally mounted for vertical movement between deployed and stowed positions, and a pair of sponsons pivotally connected for lateral movement between stowed and deployed positions outward from the hull.

A similar type vehicle is shown in Redman U.S. Pat. No. 6,526,900, wherein a wheeled-boat has vertically retractable wheels and a pair of inflatable lateral pontoons.

Engler U.S. Pat. No. 5,687,669 shows an amphibious vehicle having a pair of pontoons stowed beneath the vehicle and pivotable to a deployed position alongside the vehicle. The road wheels are carried by the pontoons and are disengaged from the road and stowed above the water line when the pontoons are being used. Jet drives are mounted in the pontoons.

Messano U.S. Pat. No. 6,840,825, which shows a similar construction, contemplates pivoting side hulls with wheels for use with motorhomes, trailers, SUVs and the like.

Veazy U.S. Pat. No. 3,933,112 discloses a mini-bus or van comprising an amphibious vehicle having a pair of removable thin pontoons that are manually attachable to the sides thereof by tubular brackets. The vehicle includes a bow attachment, a stern attachment, and a boat that is stored upside-down over the vehicle's open top to act as a roof.

Wheeled boats with foldout pontoons, decks or cabins are shown in White U.S. Pat. No. 2,727,484 for a house trailer, Allen U.S. Pat. No. 3,673,622 for a trailer camper, Kelley U.S. Pat. No. 3,877,094 for a combination trailer and pontoon boat, Bergeron U.S. Pat. No. 4,981,100 for a trailer and boat assembly with lateral pontoons pivotable into the cabin interior, and Chacon U.S. Pat. No. 6,640,737 for an expanding catamaran boat.

While all of the prior art devices are sufficient for their intended function, other constructions may provide features that may be more desirable to a user.

BRIEF SUMMARY OF THE INVENTION

The present invention is directed to overcoming one or more of the problems as set forth above.

It is an object of the present invention to provide an amphibious vehicle that may be driven from land directly into water and directly from water directly onto land without exiting the vehicle and without leaving any necessary elements, such as trailers, tow vehicles, wheels, and the like on the land or in the water.

It is a further object of the present invention to enable the transition between land and water operating modes to be done simply and automatically without substantial user intervention, such as manual positioning of components or locking together of parts.

It is an additional object of the present invention to make such an amphibious vehicle so that its appearance when operated on roads is similar to that of other vehicles being operated on roads and its appearance on water is similar to other watercraft such as catamarans and houseboats.

It is a feature of the present invention that the amphibian mechanisms can be easily adapted and installed on custom-made vehicles as well as a diverse array of conventionally-manufactured vehicles, such as cars, vans, sports utility vehicles, recreational vehicles, trucks, and the like.

It is an additional feature of the present invention to provide an amphibious mechanism that is simple, compact and inexpensive and that is also easy to transition between land and water modes of operation, while enabling unobstructed, safe road and water operation.

It is another feature of the present invention to provide a retractable hull system having a mechanism that is easily attached to the exterior of a vehicle to render the vehicle amphibious, that has operating parts disposed internally within the mechanism, and that has parts when operated are moved away from the vehicle and not into the vehicle interior.

In an exemplary embodiment, the vehicle includes a pair of longitudinal side hull elements movable between a stowed position and a deployed position laterally outboard of the vehicle and a rear panel hull element having one or more jet drives.

In another exemplary embodiment, the hull elements are pivotally connected to the vehicle and movable between a stowed position above the vehicle and a deployed position adjacent the sides and rear of the vehicle. Powered positioning means are also included to move the hulls from a stowed upper position to a deployed lower position allowing flotation of the vehicle on the water. The positioning means are also operative to raise and lower the side hull elements vertically relative to the vehicle when the hull elements are pivoted to a raised position or to a lowered position.

In another exemplary embodiment, a pair of mounting arm assemblies are provided on each lateral side of the vehicle to mount and manipulate each side hull. Each mounting arm assembly includes an upright bracket fixed to the vehicle, a telescoping arm pivotally connected to the bracket having its free end fixed to the side hull, and actuators for rotating the telescoping arm about the pivot and for extending and retracting the telescoping arm.

In another embodiment, a lock mechanism is automatically engaged without manual intervention when the hull elements are lowered to prevent lateral movement of the hull elements away from the vehicle.

In yet another embodiment, the hull elements can be longitudinally protracted and contracted to move flotation elements forwardly and rearwardly to increase flotation stability of the vehicle on water and provide suitable means to adjust the trim of the vehicle as it moves through water.

A further feature is that the rear panel hull element is pivotally connected to the vehicle and can be moved between a raised position spanning the back of the vehicle and a lowered position in the water to provide an open user platform, to provide a mount for jet drives, and to provide an adjustable planing surface to modify the vehicle's operating trim.

BRIEF DESCRIPTION OF THE SEVERAL VIEWS OF THE DRAWINGS

The details of construction and operation of the invention are more fully described with reference to the accompanying drawings which form a part hereof and in which like reference numerals refer to like parts throughout.

In the drawings:

FIG. 11a is a vertical, cross-sectional view of another embodiment of the lateral actuator assembly in lowered, extended position;

FIG. 11b is a horizontal, cross-sectional view of the T-slot lock for the lateral actuator assembly shown in FIG. 11a;

FIG. 11c is an enlarged, perspective view partially in section of the T-slot lock shown in FIG. 11b;

FIG. 14b is a back perspective view of the rear hull assembly shown in FIG. 14a;

FIG. 14c is a bottom perspective view of the rear hull assembly shown in FIG. 14a;

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood.

DETAILED DESCRIPTION OF THE PREFERRED EMBODIMENTS

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated.

Referring to the drawings in greater detail, an amphibious vehicle is seen to include a body, generally designated 20, having a chassis or bottom 21, a front section 22 with a windshield, laterally opposed side panels 23, a pair of side hulls 24 and 25, and a rear panel hull 26. A main engine or prime mover (not shown) effects rotation through a conventional drive train (not shown) of one or more of the laterally disposed traction wheels 27. As illustrated herein, the vehicle 20 is a cargo van. However, the mechanisms for effecting amphibious operation may be easily adapted for use with any car, including a sedan, station wagon, mini-van, sports utility vehicle (SUV) or pick-up. It may also be adapted for use with recreational vehicle (RV), a truck, or a bus, or any other land vehicle, wheeled or not.

For the purposes of description and to aid in the understanding of the invention disclosed herein, a longitudinal X-axis extends from front to back and rotation thereabout is referred to as roll, a lateral Y-axis extends from side to side and rotation thereabout is referred to as pitch, and a vertical Z-axis extends from top to bottom and rotation thereabout is referred to as yaw. It should be understood that parts on one lateral side of the vehicle have similar corresponding parts on the opposite side of the vehicle.

Figure 1:
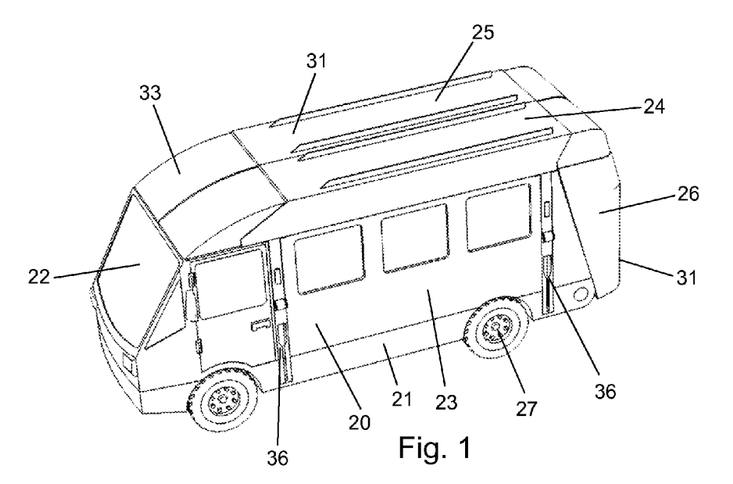
FIG. 1 is a side perspective view of one embodiment of an amphibious vehicle constructed in accordance with the invention with flotation hulls in raised storage position.
Figures 2, 2A, 2B:
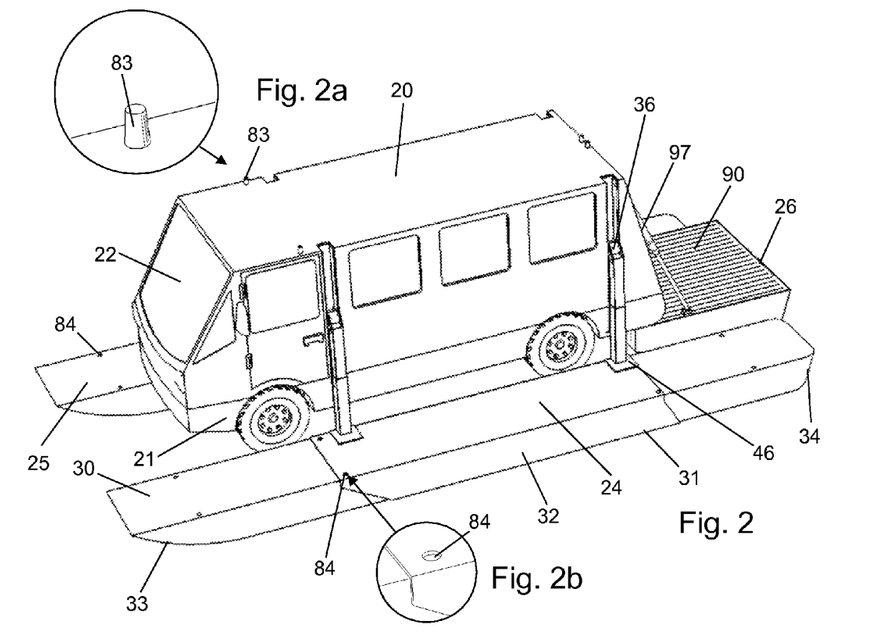
FIG. 2 is a side perspective view of the amphibious vehicle shown in FIG. 1 with flotation hulls in lowered deployed position and extended.
FIG. 2a is a perspective view of a hull locating pin on the vehicle roof.
FIG. 2b is a perspective view of a hull alignment hole in one of the side hulls.
Figure 4A:
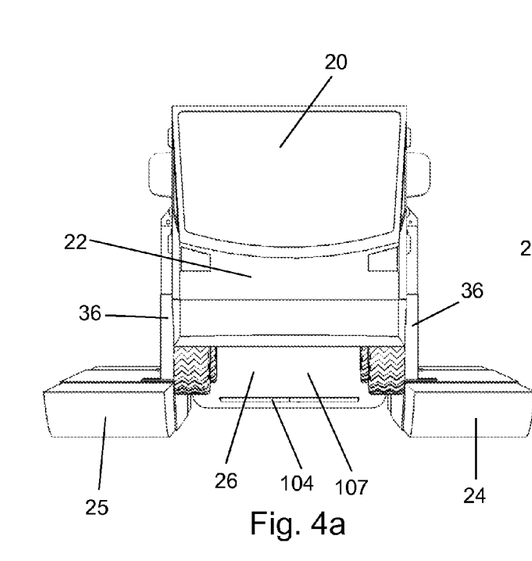
FIG. 4a is a front elevational view of the amphibious vehicle shown in FIG. 1 with flotation hulls in lowered deployed position.
Figure 4B:
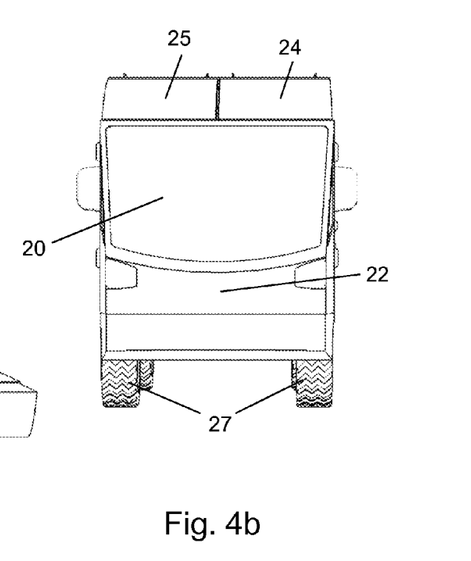
FIG. 4b is a front elevational view of the amphibious vehicle shown in FIG. 1 with flotation hulls in raised stowed position.

As will be seen, operation of the vehicle 20 on water is effected by the flotation side hulls 24 and 25 attached to the vehicle by means of two pairs of mounting arm assemblies 36 and by the flotation rear hull 26 attached to the vehicle by pivots. The side and rear hulls act as pontoons or buoyancy tanks and enable the vehicle 20 to float. As will be described in detail hereafter, the side hulls 24 and 25 are movable between an inoperative, stowed storage position above the vehicle body (FIGS. 1 and 4b) and a lowered operative deployed position, one on each lateral side of the of the vehicle body generally outboard of and adjacent to the bottom of the vehicle wheels (FIGS. 2 and 4a). Each hull is appropriately shaped to conform to the overall design and aerodynamic shape of the vehicle 20 when in land mode, and to act as a pontoon in water mode. The side hulls 24 and 25 each include a flat upper running board or top deck 30, a relatively flat bottom 31 with raised longitudinal strake ridges, upright side walls 32, and suitably-shaped angled bow 33 and rounded aft 34.

When the vehicle 20 is in land mode, the side hulls 24 and 25 are stored upside-down with the decks 30 facing downward in contact with the top the vehicle 20. As can be seen in the drawings, when the side hulls 24 and 25 are moved from upper to lower positions, the side hulls 24 and 25 are flipped 180° about a longitudinal axis so that the side hulls 24 and 25 are properly oriented for using the vehicle 20 in water mode, i.e., the straked bottom 31 in the water and the deck 20 face up.

Figure 3:
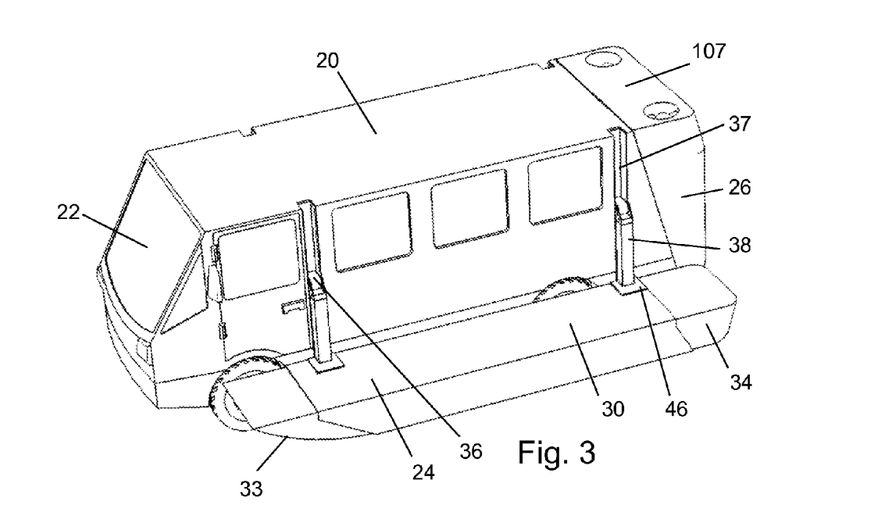
FIG. 3 is a side perspective view of the amphibious vehicle shown in FIG. 1 with flotation hulls in lowered position and contracted.
Figures 7A, 7B:
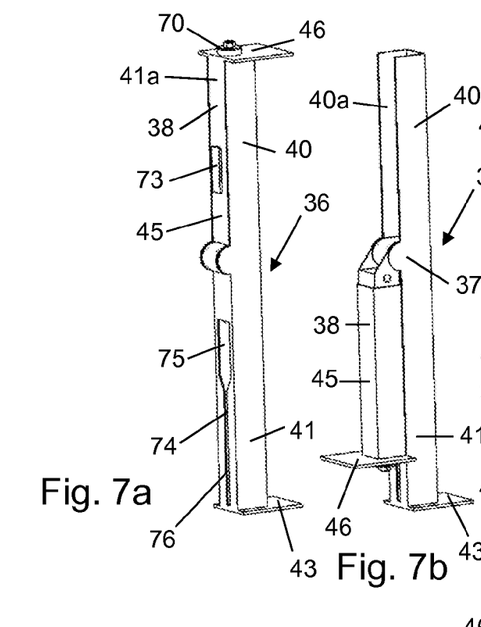
FIG. 7a is a perspective view of one of the lateral actuator assemblies in raised position.
FIG. 7b is a perspective view of the lateral actuator assembly shown in FIG. 7a in lowered position.
Figure 7C:
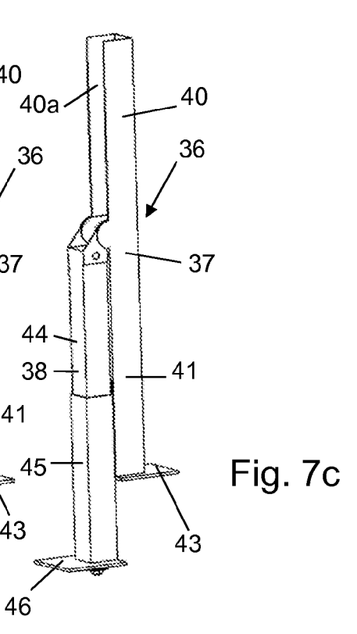
FIG. 7c is a perspective view of the lateral actuator assembly shown in FIG. 7a in lowered, extended position.
Figures 8A, 8B:
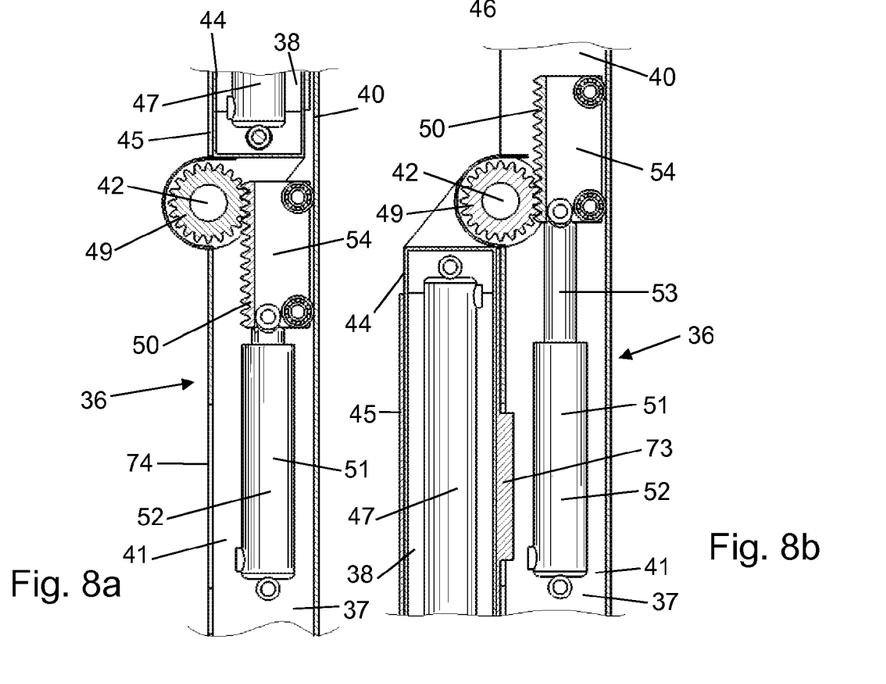
FIG. 8a is a partial, vertical cross-sectional view of the lateral actuator assembly shown in FIG. 7a in raised position.
FIG. 8b is a partial, vertical cross-sectional view of the lateral actuator assembly shown in FIG. 7a in lowered position.

As seen in the drawings, each of the side hulls 24 and 25 are mounted to the vehicle 20 by a pair of longitudinally-spaced mounting arm assemblies 36. In FIGS. 7 and 8, each mounting arm assembly 36 is seen to include an elongate mounting bracket 37 and an elongate telescoping support 38 pivotally connected thereto. The mounting brackets 37 have a U-shaped open upper channel portion 40, a box-shaped lower slotted portion 41, and a medially-located pivot 42. The mounting brackets 37 are attached to the vehicle 20 vertically immediately aft of each of the wheels 27 and include a bottom flange plate 43 that may be fixed to the vehicle frame or chassis 21 by suitable means, such as bolts, rivets or welding. A shown herein, the mounting brackets 37 are recessed into the vehicle side panels 23 to provide a flush mounting as shown in FIGS. 1-3. Alternatively, they may be simply affixed so as to lie adjacent and outwardly of the exterior of the vehicle side panels (not shown).

The telescoping supports 38 are rotatably mounted to the brackets 37 by the pivots 42 which are vertically located to provide a longitudinal rotational axis medially along the sides of the vehicle 20 laterally outward of the bracket axis. Each telescoping support 38 includes a tubular inner arm 44 having a proximal end journaled on the pivot 42, a tubular outer arm 45 extendible along the inner arm 44 and having a mounting flange plate 46 at its distal end, and an actuator 47 to effect extension and retraction of the outer arm 45. The mounting bracket 37 defines an outwardly open channel 40a in the upper portion 40 and a tube with an outer lateral surface 41a in the lower portion 41. The longitudinal axis of the pivot 42 lies generally along the plane defined by the lateral surface of the lower section. The support 38 when in upper position is in nested, axially-aligned relationship within the bracket channel 40a. In lowered position, the support arm 45 has a surface 45a facing the lateral surface 41a that lies adjacent thereto.

As seen in FIGS. 2 and 3, the side hulls 24 and 25 are fixed to the respective plates 46 of the outer arms 45 by suitable means, such as bolts, rivets, or welding. As shown herein, the side hulls 24 and 25 are fixed rigidly to the supports 38 and are generally perpendicular thereto. The supports 38 are of a length sufficient when the support arms 44 and 45 are extended to position the side hulls 24 and 25 above the vehicle in upper position and at least partially below the vehicle wheels in lower position.

To effect rotation of the telescoping supports 38 from a raised position to a lowered position, a pinion 49, which is seen in FIG. 8, is fixed to the proximal end of the outer arm 45 and engages a movable geared rack 50 within the mounting bracket 37. The rack 50 is moved by extending and retracting a linear actuator 51, which is disposed within the bracket 37. The actuator 51 has a hydraulic cylinder 52 fixed to the bracket 37 and a piston rod 53 fixed to a movable pinion trolley 54. The hydraulic cylinder 52 can be operated by known conventional means or be driven by one of the vehicle's hydraulic system, such as the power steering system (not shown) without additional hydraulic pumps. It should be understood that other electrical or hydraulic means including gears and cables may be employed to obtain equivalent operation.

Figure 9A:
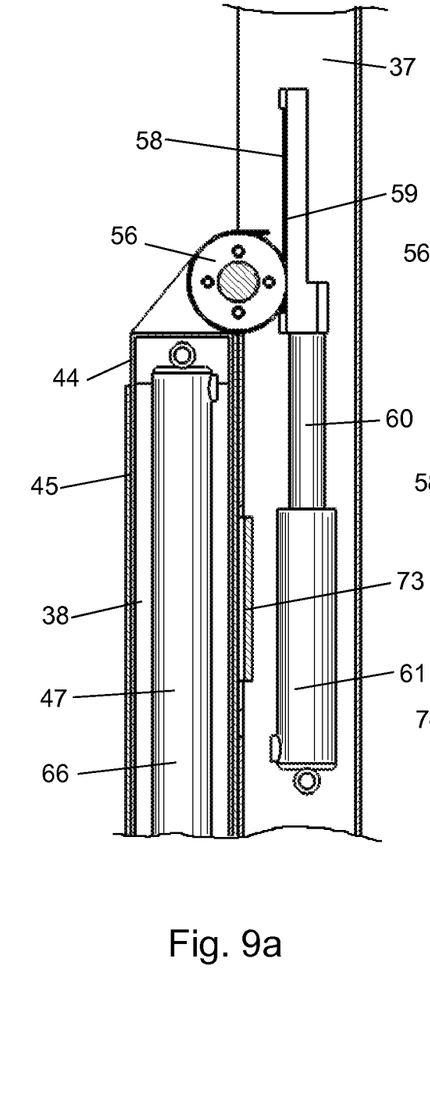
FIG. 9a is a partial, vertical cross-sectional view of another embodiment of a lateral actuator assembly in lowered position.
Figure 9B:
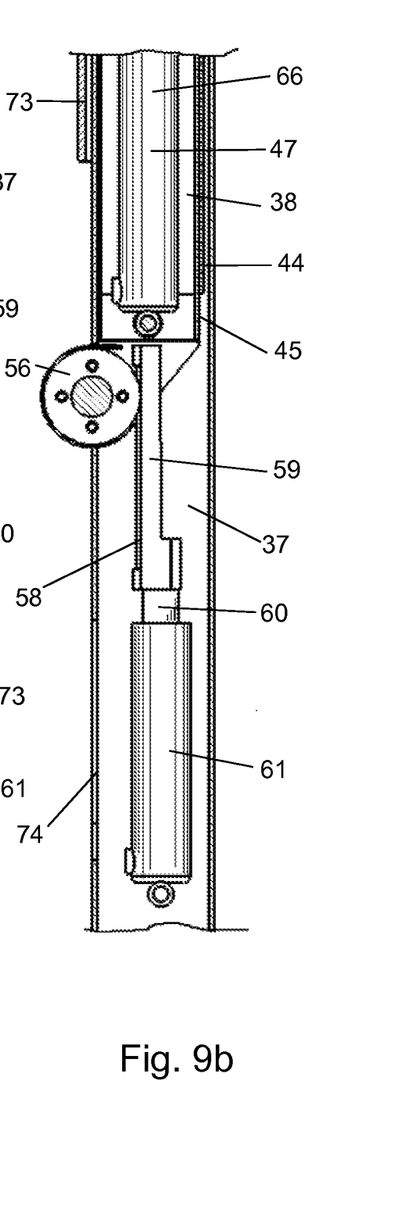
FIG. 9b is a partial, vertical cross-sectional view of the lateral actuator assembly shown in FIG. 9a in raised position.
Figures 10A, 10B:
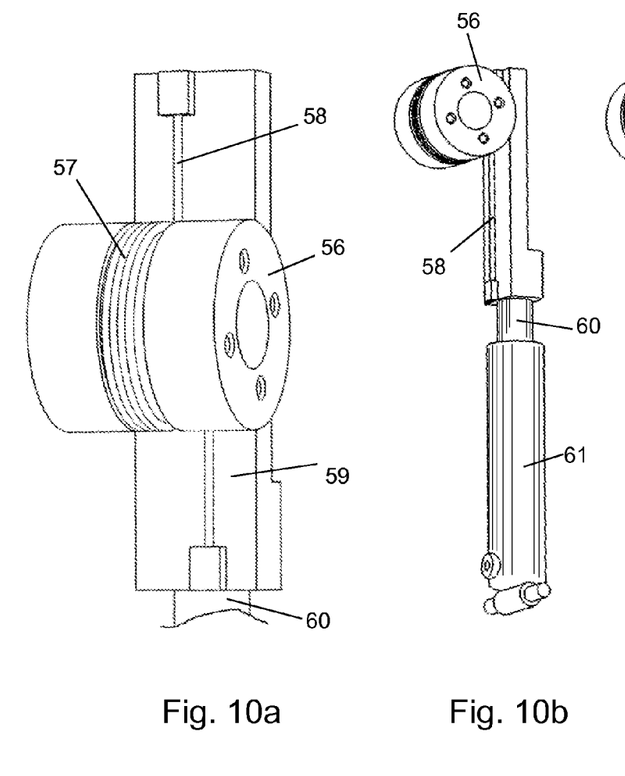
FIG. 10a is a enlarged, partial perspective view of the lateral actuator assembly shown in FIGS. 9a and 9b.
FIG. 10b is a partial, perspective view of the lateral actuator assembly of FIG. 10a in lowered position.
Figure 10C:
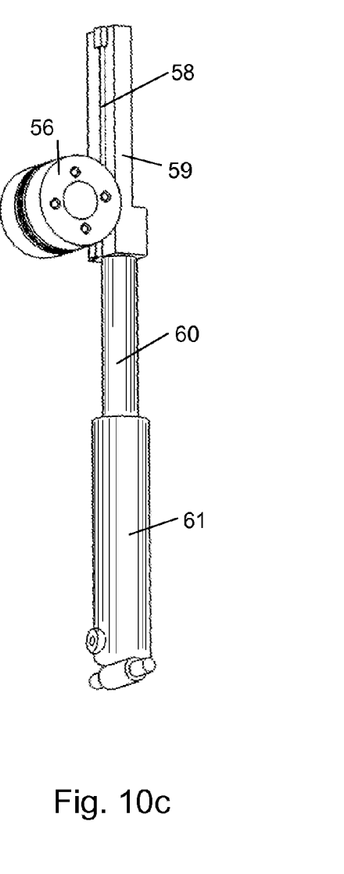
FIG. 10c is a partial, perspective view of the lateral actuator assembly of FIG. 10b in raised position.

In FIGS. 9-10, an alternative to the rack-and-pinion actuator of FIGS. 7 and 8 is shown. Herein, the telescoping support 38 is pivotally mounted to the mounting bracket 37 by journaled roller 56. The roller 56 is formed with a groove 57 within which an elongate cable 58 is wound. The ends of the cable 58 are secured to respective ends of a carrier 59 located adjacent and transverse to the roller 56.

The carrier 59, in turn, is fixed at the end of a piston rod 60 that is moved by a hydraulic cylinder 61 attached to the mounting bracket 37. When the cylinder 61 is actuated, the carrier 59 is moved linearly to wind the cable 58 and effect rotation of the roller 56 and thereby pivot the telescoping support 38.

Figures 11A, 11B, 11C:
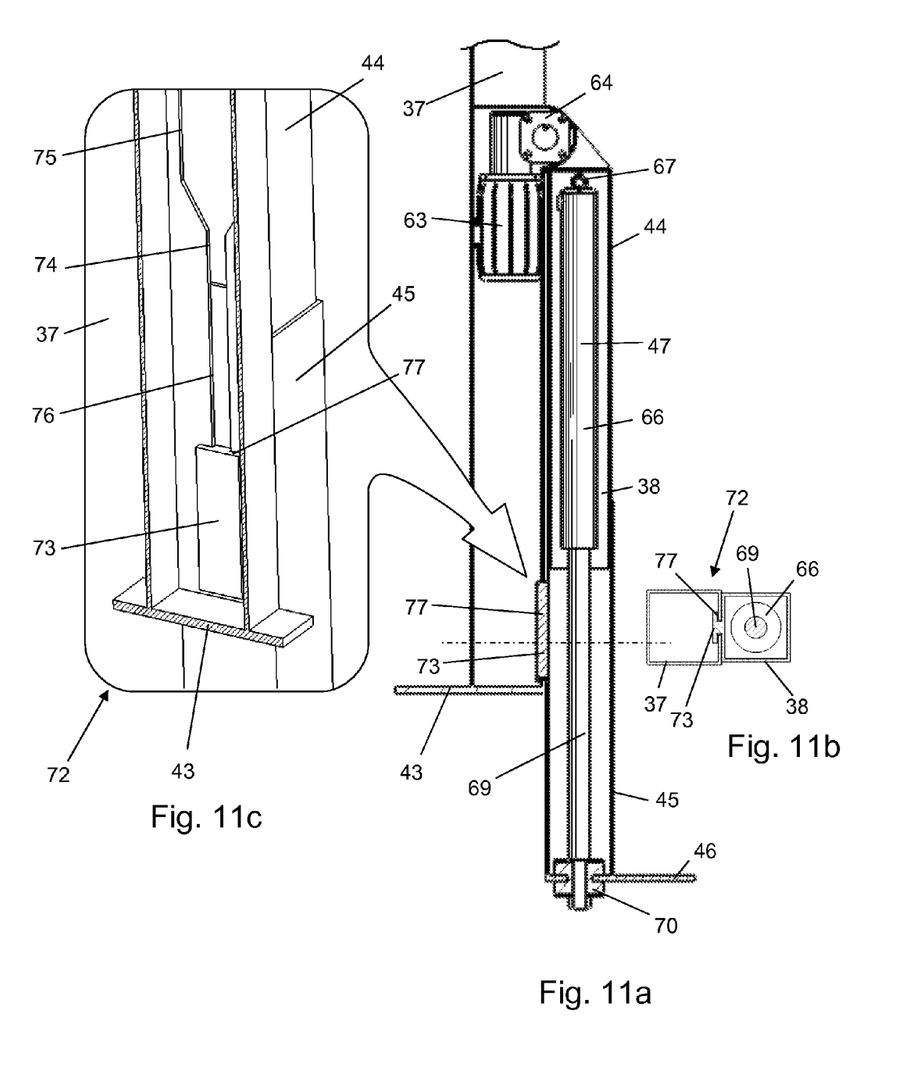

In FIG. 11a, another construction for mounting the telescoping support 38 to the bracket 37 is shown. An electric motor 63 is mounted within the interior of the mounting bracket 37 and includes a right-angle gear assembly 64 to effect rotation of the telescoping support 38 about the pivot between raised position within the upper portion 40 of the mounting bracket 37 and a lowered position adjacent to and outboard of the lower portion 41 of the mounting bracket 37.

After the telescoping support 38 has been rotated to its lowered position, it may be extended by operation of the linear actuator 47 disposed within the arms 44 and 45. The linear actuator 47 shown in FIG. 11a has a cylinder 66 fixed to the inner arm 44 by pin 67 and a piston rod 69 fixed to the outer arm mounting plate 46 by end lock 70. By extending or retracting the rod 66, the side hulls 24 and 25 may be moved to a fully lowered deployed position or a raised position or any desired immediate extended position. By moving the side hulls 24 and 25 in this fashion, the vehicle height above or below the water line or the roll of the vehicle 20 may be selectively adjusted.

Figure 5:
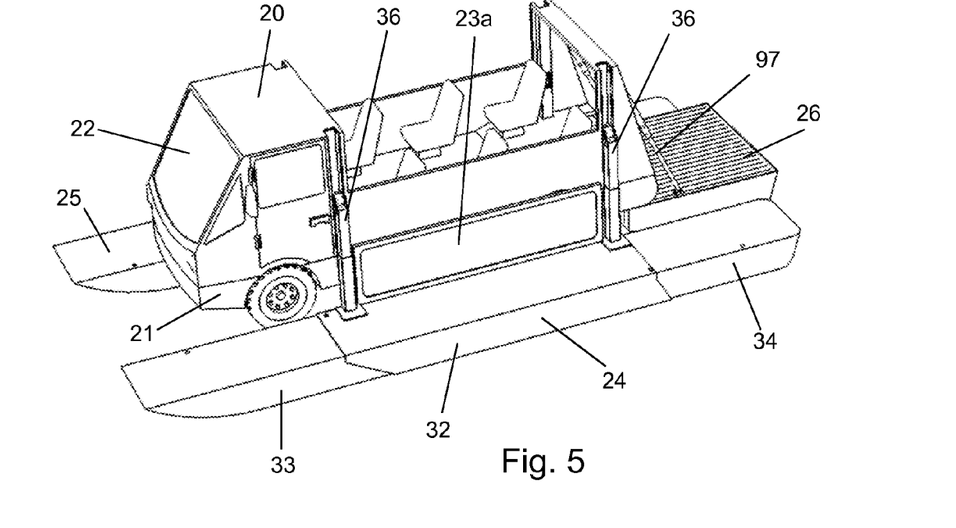
FIG. 5 is a side perspective view of an amphibious vehicle constructed in accordance with the invention showing a vehicle without a roof, the windows folded down, and hulls fully deployed.
Figure 6:
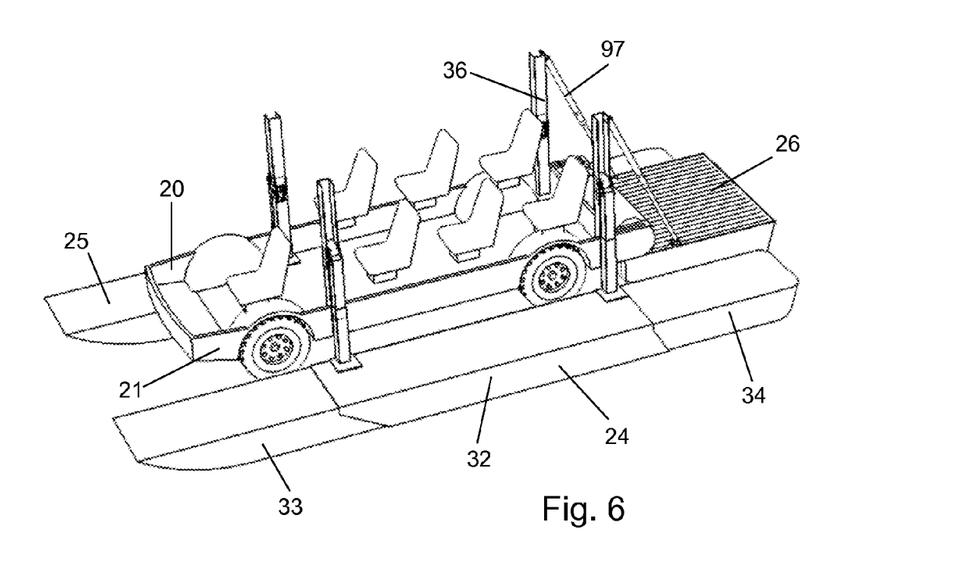
FIG. 6 is a side perspective view of an amphibious vehicle constructed in accordance with the invention showing a vehicle without side panels or a roof and hulls fully deployed.

In FIG. 5, a wheeled vehicle 20 with deployed side hulls is shown in which the vehicle cabin has no roof. A window unit 23a is pivoted to a position along the side panel bottom 21 upon operation of the actuators 36 to which it is attached. Here, the side hulls 24 and 25 act as the roof of the vehicle 20 when moved to a stowed position above the cabin. In FIG. 6, a wheeled vehicle 20 with deployed side hulls 24 and 25 is shown with only a bottom or chassis and no side panels or roof. This construction provides a completely open cabin adapted for outdoor use, and more particularly, for water use.

As best seen in FIGS. 7a and 11a,b,c, to prevent the telescoping support 38 from moving outward after it has been moved to its lowered position, a locking mechanism, generally designated 72, is provided comprising T-head 73 extending from the lateral surface 40a of the outer arm 45 and a cooperating T-slot 74 formed in the lateral surface 41a of the lower portion 41 of the mounting bracket 37. When the retracted telescoping support 38 is rotated to its lowered position, the T-head 73 is received by the wide upper portion 75 of the T-slot 74. As the outer arm 45 is extended, the T-head 73 is moved downward into the narrow lower portion 76 of the T-slot 74 that extends downward from the wide portion 75. As a result, the extending legs 77 of the T-head 73 engage the backside of the T-slot 74 limiting movement of the telescoping support 38 laterally outward from the vehicle 20. When the outer arm 45 is retracted, the cooperating locking mechanism 72 is released and when the support arm is rotated outwardly and upwardly, the lock is disengaged.

Figures 12A, 12B:
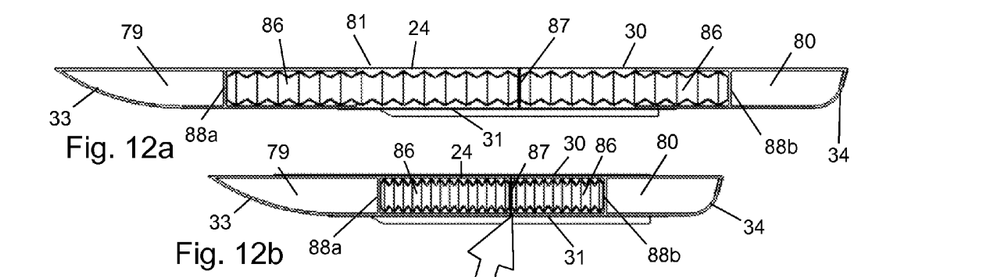
FIG. 12a is a vertical, cross-sectional view, of one of the floatation hulls in protracted position.
FIG. 12b is a vertical, cross-sectional view, of the side hull shown in FIG. 12a in retracted position.
Figure 12C:
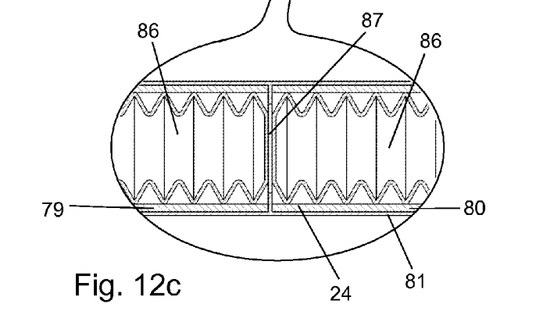
FIG. 12c is an enlarged, partial cross-sectional view of the side hull shown in FIG. 12b.
Figures 13A, 13B:
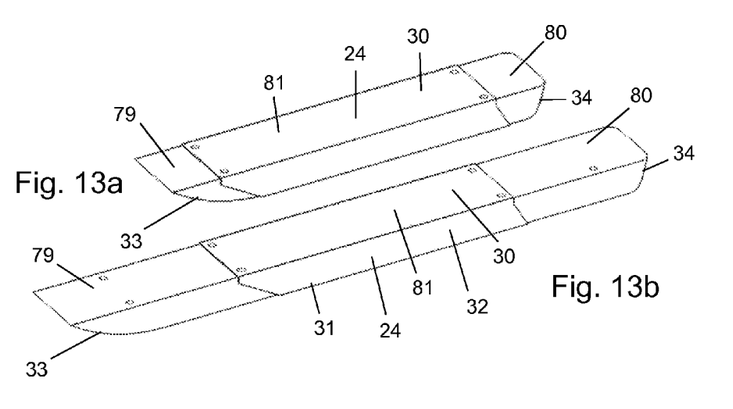
FIG. 13a is a side perspective view of one of the side hulls in retracted position.
FIG. 13b is a side perspective view of the side hull shown in FIG. 13a in protracted position.

In FIGS. 12-13, the construction of the flotation side hulls 24 and 25 is seen. While the side hulls may each be made as a unitary unit, herein each side hull 24 and 25 defines an interior space and comprises a fore section 79, a aft section 80 and a medial section 81, each of a size and configuration permitting the outer sections to be telescoped into the medial section. The fore section 79 and the aft section 80 can be at least partially retracted into the medial section 81 and telescoped to an extended position.

Located on the top of the vehicle cabin are a set of upright locking elements or tapered locating pins 83 that engage alignment holes 84 in the deck of the side hulls 24 and 25. Operation of the extending actuator 47 is employed to raise the hull alignment holes 84 off the locating pins 83 located on the top of the vehicle 20 or to lower the hulls 24 and 25 onto the pins 83. When the pins 83 are located in the holes 84, the hulls 24 and 25 are prevented from moving longitudinally or laterally along the vehicle top. As seen in FIGS. 2 and 13, when the hulls 24 and 25 are contracted, the alignment holes 84 in the fore and aft sections 79 and 80 are vertically aligned with the alignment holes 84 in the medial section 81.

As seen in FIG. 12, a pair of expandable bellows or boots 86 are located within the hollow interior of the side hulls 24 and 25 and act as air bladders. The proximal ends of the boots 86 are attached to a bulkhead 87 in the medial section 81 and the distal ends of the boots 86 to respective bulkheads 88a and 88b in the fore and aft sections. By inflating or deflating the boots 86, the side hulls 24 and 25 may be, respectively, protracted or contracted. Inflation and deflation of the boots 86 is accomplished by adding compressed gas to increase vehicle load capacity on water or by removing compressed gas to decrease the size of the side hulls 24 and 25 while on land. The compressed gas can be provided by a conventional pump system or by using engine exhaust gas that is diverted by valve means to the boot and is removed from the boot by the vehicle engine vacuum system without the need for additional pumps.

Figure 14A:
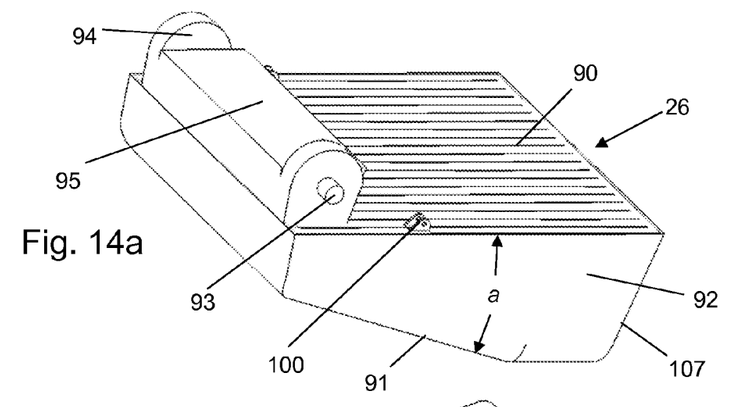
FIG. 14a is a front perspective view of the vehicle rear hull assembly.
Figures 14B, 14C:
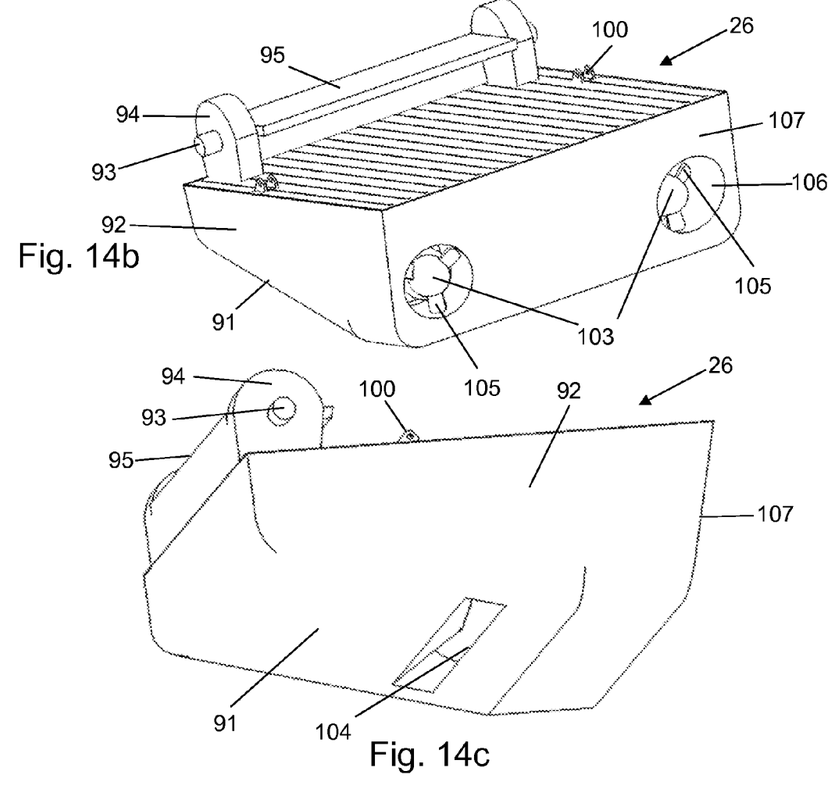
Figure 15A:
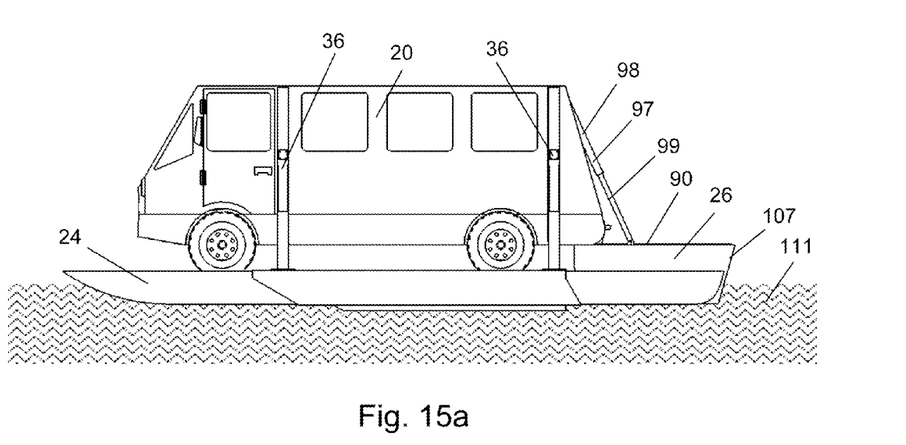
FIG. 15a is a side elevational view of the vehicle operating on water.
Figure 15B:
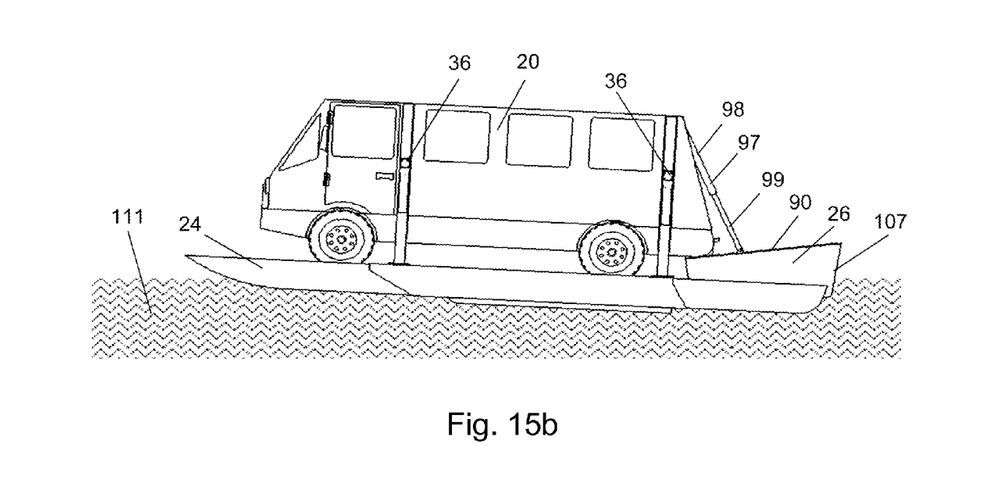
FIG. 15b is a side elevational view of the vehicle shown in FIG. 15a with the real panel assembly rotated to provide trim to adjust the pitch of the vehicle upward.

In FIGS. 14 and 15, the rear panel assembly or rear hull, generally designated 26, which includes internal water propulsion units is shown. The rear hull 26 is movable between a generally vertical stowed position at the vehicle back (FIG. 1) and a lowered generally horizontal deployed position (FIG. 2). The generally boat-shaped rear hull 26 may be formed as a hollow plastic or metal body. The rear hull 26 includes a ribbed top deck 90, a bottom planing panel 91, and side walls 92 arcuately connecting the deck and bottom panels, laterally extending pivots 93 mounted on spaced uprights 94, and a flat step 95 extending between the uprights 94. The lower forward portion of the rear hull 26 is rotatively mounted to the lower back portion of the vehicle 20 by means of the pivots 93 so that the rear hull 26 may be adjustably moved between its closed upright position (FIG. 1) and its open position (FIG. 2). The pivotal mounting provides for rotation of the rear hull 26 over a range of movement greater than 90°. When raised to its upright position, the rear hull 26 acts as a vertical rear door. When lowered to its open position, it acts as a horizontal platform deck and flotation hull.

Actuators 97 extending between the vehicle 20 and the rear hull 26 effect selective angular movement relative to the vehicle 20 about a horizontal lateral axis. While the actuators 97 may be attached anywhere, the hydraulic cylinders shown herein have the distal ends of the cylinders 98 attached to the tops of the mounting brackets (FIG. 6) and the distal ends of the piston rods 99 attached to pairs of brackets 100 fixed to the opposite lateral sides of the deck 90.

The hollow rear hull 26 has one or more internal cavities to accommodate one or more engines, such as conventional-type jet drives 103 that provide propulsion while the vehicle 20 is on the water. The jet drives 103 may be driven by the vehicle's electric system, or alternatively, the jet drives 103 may be driven by a separate electrical alternator powered by the vehicle's main engine or by a separate power system accommodated and mounted within the interior of the rear hull 26. An intake 104 is formed in the bottom planing panel 91 for incoming water that is then forcefully ejected by rotating impellers 105 through nozzles or openings 106 in the back wall 107 of the rear hull 26 opposite its pivoted forward end. By this means, the vehicle 20 is propelled through the water.

Steering or adjustment of the yaw of the vehicle 20 may be accomplished by operating the jet drives 103 at different levels thereby causing the vehicle to turn or rotate about its vertical axis.

The trim or pitch of the vehicle 20 while it is traveling on the water may be adjusted by changing the speed of travel and by adjusting the angle of the rear hull assembly 26 as seen in FIGS. 15*a* and 15*b*. This can be accomplished by extending or retracting the rear hull door actuators 97. Typically, the surface of the planing panel 91 of the rear hull 26 has an angle a (FIG. 14*a*) in the range of 10° to 30° relative to the plane of the top deck 90 and extends downwardly and rearwardly therefrom so that the angled planing panel 91 contacts the water when the rear hull 26 is lowered to a horizontal position. Typically, the rear hull 26 is operated in a position in which the top deck 90 is horizontal, but this can be selectively angularly adjusted upward or downward as desired.

Figure 16A:
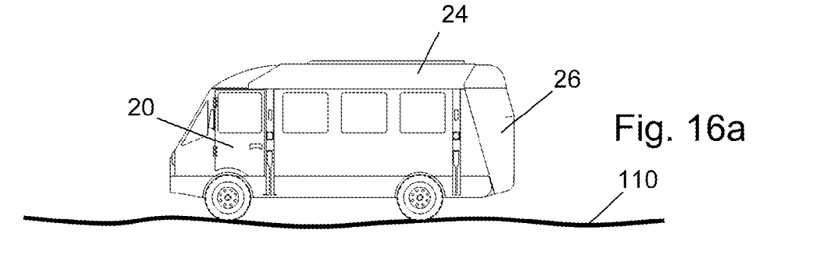
FIGS. 16a-16e are side elevational views of the sequential steps for the amphibious vehicle shown herein to transition from land operation to water operation; and, FIGS. 17a-17d are side elevational views of the sequential steps for the amphibious vehicle shown herein to transition from water operation to land operation.
Figure 16B:
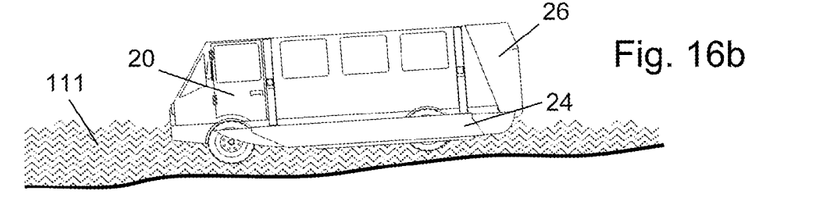
Figure 16C:
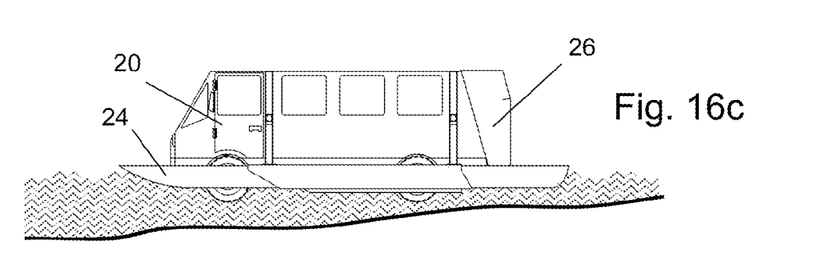
Figure 16D:
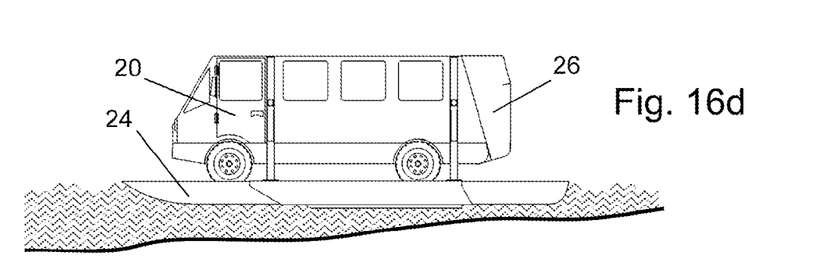
Figure 16E:
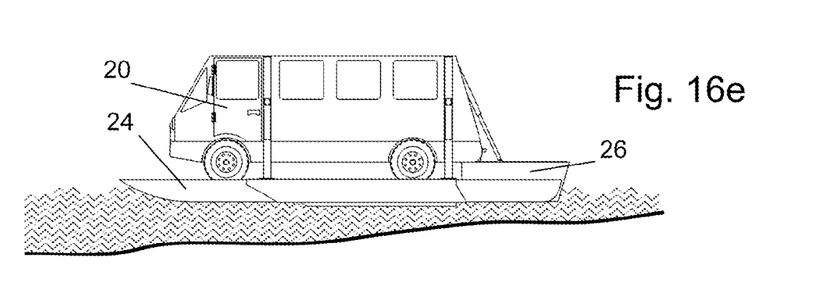

FIGS. 16*a*-16*e* illustrate the procedural steps for transitioning the vehicle 20 from land 110 to water 111. In FIG. 16*a*, when the vehicle 20 is operating on land, the side hulls 24 and 25 are stowed on top of the vehicle 20. When the vehicle 20 is driven into shallow water (FIG. 16*b*), the side hulls 24 and 25 are lifted off the locating pins 83 and the telescoping supports 38 are rotated to move the side hulls 24 and 25 to an intermediate lowered position. The side hulls 24 and 25 are then longitudinally protracted to create additional buoyancy (FIG. 16*c*) as the vehicle 20 loses wheel traction and is floated off the water bottom. Thereafter, the telescoping supports 38 are extended (FIG. 16*d*) to fully deploy the side hulls 24 and 25 and raise the vehicle 20 well above the water line. Finally, the rear hull 26 is pivoted into the water (FIG. 16*e*) and the jet drive propulsion units 103 are engaged to propel the vehicle 20 forward.

Figure 17A:
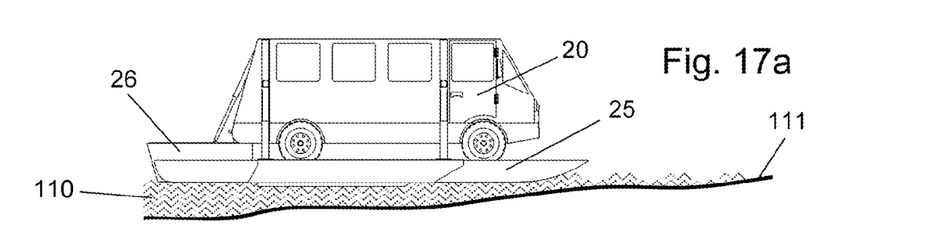
Figure 17B:
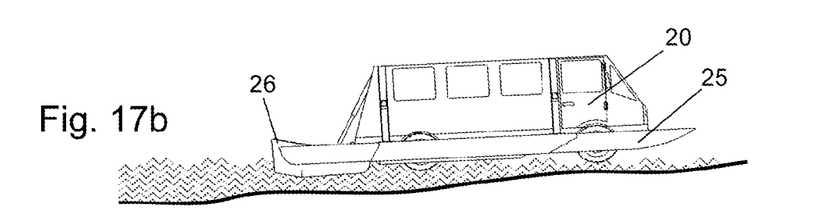
Figure 17C:
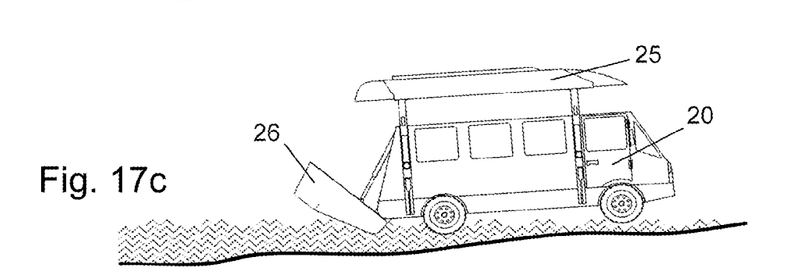
Figure 17D:
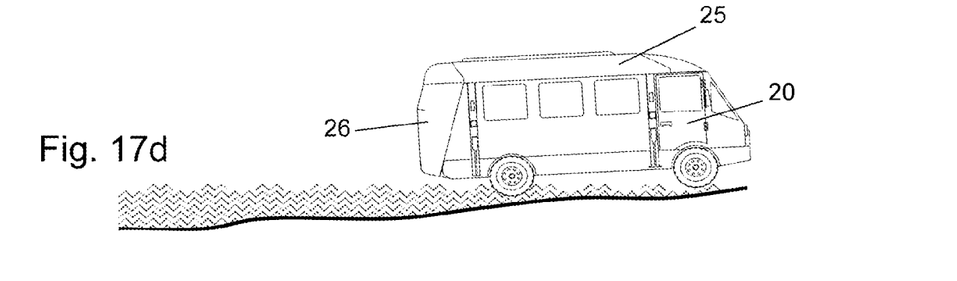

FIGS. 17*a*-17*d* illustrates the procedural steps for transitioning the vehicle 20 from water to land use. In FIG. 17*a*, the vehicle 20 with the side hulls 24 and 25 fully extended and in deployed position is driven close to shore. The telescoping supports 38 are vertically retracted to move the side hulls 24 and 25 to an intermediate position (FIG. 17*b*) so that the vehicle wheels contact the water bottom and gain traction. The side hulls 24 and 25 are contracted, the telescoping supports 38 are rotated to position the side hulls 24 and 25 above the top of the vehicle, the jet drive propulsion units 103 are disengaged, and the rear hull 26 is pivoted from the water (FIG. 17*c*). Finally, the side hulls 24 and 25 are lowered into stowed position on the vehicle top and the vehicle 20 driven out of the water (FIG. 17*d*).

It is noted that while a fixed-length hull or a sealed pontoon might be employed herein, greater stability and buoyancy can be achieved with a larger structure or a smaller one that can be enlarged. Variations in buoyancy are desirable where the gross or net weight of the vehicle might vary or where water conditions demand different levels of buoyancy.

Note that the hydraulic cylinders employed as linear actuators herein may be replaced by any number of equivalent mechanisms, namely, jackscrews, rotary drivers, motor-driven cables, and the like.

The dimensions of an amphibious van or truck similar to the type shown herein would be on the order of about 20 feet long, 6 to 7 feet wide, 7 to 8 feet tall, and weigh 1 to 3 tons. The side hulls contemplated herein would each be about 25 to 30 feet long extended, 3 to 3½ feet wide, and 2 feet high. Flotation hulls of the size described should easily support a vehicle of the type shown. It is understood that variations in design and size of the components used would depend on the type, size and weight of the vehicle to which the amphibian mechanism is attached.

INDUSTRIAL APPLICABILITY

It should be apparent the amphibious vehicle described herein is a simple, functional unit that is effective and easily constructed and operated.

Other aspects, objects and advantages of this invention can be obtained from a study of the drawings, the disclosure and the appended claims.

It should be understood that the terms "top," "bottom," "front," "back," "forward," "rear," "first," "second," "upper," "lower," "height," "width," "length," "end," "side," "horizontal," "vertical," and similar terms as used herein, have reference only to the structure shown in the drawings and are utilized only to facilitate describing the invention. The terms and expressions employed herein have been used as terms of description and not of limitation.

From the foregoing, it will be observed that numerous variations and modifications may be effected without departing from the spirit and scope of the invention. It is to be understood that no limitation with respect to the specific apparatus illustrated herein is intended or should be inferred. While specific embodiments of the invention have been disclosed, one of ordinary skill in the art will recognize that one can modify the dimensions and particulars of the embodiments without straying from the inventive concept.

What is claimed is:

1. An amphibious vehicle having a front, a back, and spaced lateral sides, comprising:
    a plurality of mounting brackets with at least one of the mounting brackets being attached at each lateral side of the vehicle;
    a plurality of supports with a support connected with each of the mounting brackets and having inner and outer ends, the inner end being mounted to a respective bracket for rotation of the support about a longitudinal pivot axis between upper and lowered positions, the supports being extendible to move the outer end away from and towards the inner end;
    first actuators operatively connected respectively between the mounting brackets and supports for effecting pivotal movement of the supports;
    second actuators operatively connected between respective supports for effecting linear extension of the supports; and,
    a flotation side hull for each lateral side of the vehicle secured to the outer end of respective supports, wherein the side hulls may be moved selectively from a storage position above the vehicle to a flotation position by operation of the first actuators to rotate the supports outward and downward and extending the supports by operation of the second actuators to adjustably position the side hulls vertically.

2. The amphibious vehicle of claim 1 wherein each of the supports comprises first and second support arms each having proximal and distal ends, the second support arm being positioned in telescoping relationship with the first support arm, the first support arm proximal end being pivotally mounted to the mounting bracket, and the second support arm distal end being secured to a respective side hull.

3. The amphibious vehicle of claim 2 further including a locking mechanism on the mounting bracket and the second support arm engageable when the first support arm is pivoted to a lowered position to limit movement of the second support arm when extended and disengageable when retracted.

4. The amphibious vehicle of claim 3 wherein the locking mechanism comprises a T-head on one of the mounting bracket and the second support arm and a T-slot in the other of the mounting bracket and the second support arm, the T-slot having a wide portion allowing movement of the T-head therethrough and a narrow portion extending from the wide portion limiting lateral movement of the T-head and allowing relative linear motion of the T-head therealong.

5. The amphibious vehicle of claim 4 wherein the mounting bracket has vertically disposed upper and lower portions with the upper portion defining an outwardly open channel and the lower portion defining a tube with a lateral surface, the pivot being laterally positioned such that the support when in upper position is in nested relationship within the bracket open channel and the second support arm when in lowered position has a surface facing the lateral surface, and the support arms are of a length sufficient when extended to locate the side hulls above the vehicle in upper position and at least partially below the vehicle in lowered position.

6. The amphibious vehicle of claim 5 wherein one part portion of the locking mechanism is on the lateral surface of the bracket lower portion and on the other portion of the locking mechanism is on the facing surface of the second support arm.

7. The amphibious vehicle of claim 2 wherein the first actuators include a pinion gear fixed to the first support arm adjacent the proximal end thereof, a movable gear rack engaging the pinion gear, and a hydraulic cylinder and piston rod operatively connected between the mounting bracket and the gear rack, wherein operation of the hydraulic cylinder moves the gear rack linearly to rotate the pinion gear so as to effect pivotal rotation of the first support arm relative to the vehicle.

8. The amphibious vehicle of claim 2 wherein the first actuators include a roller fixed to the first support arm adjacent the proximal end thereof, a carrier, a cable element secured to the carrier and wound around the roller, and a hydraulic cylinder and piston rod operatively connected between the mounting bracket and the carrier, wherein operation of the cylinder moves the carrier thereby winding the cable element and rotating the roller and so as to effect pivotal rotation of the first support arm relative to the vehicle.

9. The amphibious vehicle of claim 2 wherein the first actuators include a motor fixed relative to the mounting bracket and a right-angle gear assembly operatively connected between the motor and the first support arm, wherein operation of the motor operates the gear assembly to effect pivotal rotation of the first support arm relative to the vehicle.

10. The amphibious vehicle of claim 2 wherein the second actuators include a hydraulic cylinder and piston rod with one of the cylinder and rod being attached to the first support arm and the other of the cylinder and rod being attached to the second support arm.

11. The amphibious vehicle of claim 10 wherein the mounting bracket extends vertically and has spaced upper and lower ends, the mounting bracket lower end having a transversely extending mounting plate providing a flange for attaching the mounting bracket to the vehicle, and the outer end of the second support arm has a transversely extending mounting plate providing a flange for attaching the second support arm to the side hull.

12. The amphibious vehicle of claim 1 wherein the mounting bracket extends vertically and has spaced upper and lower ends, the mounting bracket lower end having a transversely extending mounting plate providing a flange for attaching the mounting bracket to the vehicle, and wherein the outer end of the support has a transversely extending mounting plate providing a flange for attaching the support to the side hull.

13. The amphibious vehicle of claim 1 wherein there are a pair of longitudinally spaced supports at each lateral side of the vehicle.

14. The amphibious vehicle of claim 1 wherein the mounting brackets are positioned laterally inward of the lateral sides of the vehicle.

15. The amphibious vehicle of claim 1 wherein the side hulls have fore and aft sections operatively connected to move forwardly and rearwardly to protracted and retracted positions to selectively lengthen and shorten the side hulls.

16. The amphibious vehicle of claim 15 further including an expandable bladder within each side hull, and wherein the bladder is operatively connected to said fore and aft sections and may be selectively inflated to lengthen the side hull by protracting the fore and aft sections or deflated to shorten the side hull by contracting the fore and aft sections.

17. The amphibious vehicle of claim 1 further including locating pins extending upward from the vehicle and locating holes defined in the side hulls configured and arranged to cooperate with the pins to limit movement of the side hulls longitudinally and laterally when the side hulls are moved to a stowed position above the vehicle and located on the pins.

18. The amphibious vehicle of claim 1 further including a rear hull pivotally mounted to the back of the vehicle wherein the rear hull may be rotated between a generally upright closed position and an open position extending rearward from the back of the vehicle.

19. The amphibious vehicle of claim 18 further including at least one actuator operatively connected between the vehicle and the rear hull to effect pivotal rotation of the rear hull relative to the back of the vehicle.

20. The amphibious vehicle of claim 19 wherein the rear hull has an internal cavity defined by a top deck, a bottom panel and opposed side panels connecting the top deck and bottom panel, and wherein the rear hull is pivotally mounted for rotation about a laterally extending horizontal axis between a closed position with the top deck generally aligned with the back of the vehicle and an open extended position such that when operating in water the bottom panel may contact the water.

21. The amphibious vehicle of claim 20 wherein the rear hull has a lower forward portion pivotally connected to a lower back portion of the vehicle and wherein the bottom panel extends downwardly and rearwardly from the forward portion at an angle between 10° and 30° from the plane of the top deck when the top deck is in a generally horizontal position.

22. The amphibious vehicle of claim 21 further including at least one jet drive carried by the rear hull to provide propulsion for the vehicle when operating in water.

23. The amphibious vehicle of claim 22 wherein the jet drive is carried within the internal cavity of the rear hull and the rear hull includes a water intake for the jet drive and a discharge opening for ejected jet drive water.

24. An amphibious vehicle having a front, a back, and spaced lateral sides, comprising:
a plurality of mounting brackets with at least one of the mounting brackets being attached at each lateral side of the vehicle;
a plurality of supports with a support connected with each of the mounting brackets and having inner and outer ends, each support including first and second support arms each having proximal and distal ends, the first support arm being positioned in telescoping relationship with the second support arm and having a proximal end pivotally mounted to the mounting bracket;

first actuators operatively connected respectively between mounting brackets and first support arms for effecting pivotal movement of the supports;

second actuators operatively connected between respective first and second support arms for effecting linear extension of the support;

a flotation side hull for each lateral side of the vehicle secured to a distal end of respective second support arms, wherein the side hulls may be moved selectively from a storage position above the vehicle to a flotation position by operation of the first actuators to rotate the support outward and downward and extending the support by operation of the second actuators to adjustably position the side hulls vertically; and a locking mechanism on the mounting bracket and the second support arm engageable when the first support arm is pivoted to a lowered position to limit movement of the second support arm when extended and disengageable when the second support arm is retracted.

25. An amphibious vehicle having a front, a back, and spaced lateral sides, comprising:

two pairs of mounting brackets with each pair of mounting brackets being spaced along and attached at each lateral side of the vehicle;

a plurality of supports with a support connected with each of the mounting brackets and having inner and outer ends, each support including first and second support arms each having proximal and distal ends, the first support arm being positioned in telescoping relationship with the second support arm and having a proximal end pivotally mounted to the mounting bracket;

first actuators operatively connected respectively between mounting brackets and first support arms for effecting pivotal movement of the support arms;

second actuators operatively connected between respective first and second support arms for effecting linear extension of the support;

a flotation side hull for each lateral side of the vehicle secured to a distal end of respective second support arms, wherein the side hulls may be moved selectively from a storage position above the vehicle to a flotation position by operation of the first actuators to rotate the support outward and downward and extending the support by operation of the second actuators to adjustably position the side hulls vertically;

a locking mechanism on the mounting bracket and the second support arm engageable when the first support arm is pivoted to a lowered position to limit movement of the second support arm when extended and disengageable when the second support arm is retracted, said locking mechanism including a T-head on one of the mounting bracket and the second support arm and a T-slot in the other of the mounting bracket and the second support arm, the T-slot having a wide portion allowing movement of the T-head therethrough and a narrow portion extending from the wide portion limiting lateral movement of the T-head and allowing relative linear motion of the T-head therealong;

a rear hull pivotally mounted to the back of the vehicle having an internal cavity;

a third actuator operatively connected between the vehicle and the rear hull to effect pivotal rotation of the rear hull relative to the back of the vehicle; and, a jet drive carried within the internal cavity, the rear hull including a water intake for the jet drive and a discharge opening for ejected jet drive water.

* * * * *